(12) United States Patent
Saito et al.

(10) Patent No.: US 10,910,972 B2
(45) Date of Patent: Feb. 2, 2021

(54) CONTROL APPARATUS AND ONBOARD SYSTEM

(71) Applicant: DENSO CORPORATION, Kariya (JP)

(72) Inventors: Kohei Saito, Kariya (JP); Tomohisa Ose, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/690,795

(22) Filed: Nov. 21, 2019

(65) Prior Publication Data

US 2020/0091847 A1 Mar. 19, 2020

Related U.S. Application Data

(63) Continuation of application No. PCT/JP2018/018995, filed on May 16, 2018.

(30) Foreign Application Priority Data

May 25, 2017 (JP) ................................ 2017-103618

(51) Int. Cl.
| | | |
|---|---|---|
| *H02P 9/04* | (2006.01) | |
| *B60K 25/02* | (2006.01) | |
| *B60R 16/033* | (2006.01) | |
| *F02D 29/06* | (2006.01) | |
| *H02P 101/25* | (2016.01) | |
| *H02P 101/45* | (2016.01) | |

(52) U.S. Cl.
CPC ................ *H02P 9/04* (2013.01); *B60K 25/02* (2013.01); *B60R 16/033* (2013.01); *F02D 29/06* (2013.01);
(Continued)

(58) Field of Classification Search
CPC .... H02P 9/04; H02P 2101/25; H02P 2101/45; B60K 25/02; B60K 6/485; B60R 16/033;
(Continued)

(56) References Cited

U.S. PATENT DOCUMENTS

| | | |
|---|---|---|
| 2005/0034451 A1 | 2/2005 | Miyashita |
| 2007/0204594 A1 | 9/2007 | Ishii |

(Continued)

FOREIGN PATENT DOCUMENTS

| | | |
|---|---|---|
| JP | H06-343300 A | 12/1994 |
| JP | H09-79064 A | 3/1997 |

(Continued)

OTHER PUBLICATIONS

Jun. 12, 2018 Search Report issued in International Patent Application No. PCT/JP2018/018995.

*Primary Examiner* — Charles Reid, Jr.
(74) *Attorney, Agent, or Firm* — Oliff PLC

(57) ABSTRACT

A control apparatus is used in an onboard system provided to a vehicle. The onboard system includes an internal combustion engine and a power generator. The power generator generates power and supplies the generated power to an electrical load provided to the vehicle. An output torque of the internal combustion engine causes the vehicle to travel and causes the power generator to generate power. Based on a power supply request by the electrical load, the control apparatus controls the output torque of the internal combustion engine. In response to the output torque being increased based on the power supply request, the control apparatus causes the power generator to generate the power by the output torque, while restricting generated power during an initial period when the output torque is being increased.

13 Claims, 6 Drawing Sheets

(52) U.S. Cl.
CPC ...... *H02P 2101/25* (2015.01); *H02P 2101/45* (2015.01)

(58) Field of Classification Search
CPC ...... F02D 29/06; F02D 2250/18; F02D 29/02; B60W 20/13; B60W 20/10; B60W 2510/305; B60W 10/06; B60W 10/08; B60L 50/16; B60L 1/00; F01N 3/20
USPC ...................................................... 290/40 B
See application file for complete search history.

(56) References Cited

U.S. PATENT DOCUMENTS

| | | | |
|---|---|---|---|
| 2008/0125954 A1 | 5/2008 | Kuroda et al. | |
| 2013/0080023 A1* | 3/2013 | Livshiz | F02D 41/0002 701/102 |
| 2013/0131931 A1* | 5/2013 | Mitsuyasu | F16H 61/66259 701/48 |
| 2013/0324363 A1 | 12/2013 | Hashimoto | |
| 2015/0002053 A1* | 1/2015 | Endo | B60L 50/51 318/139 |
| 2015/0038287 A1* | 2/2015 | Endo | B60W 10/08 477/3 |
| 2015/0203091 A1* | 7/2015 | Wang | B60W 10/06 701/22 |
| 2015/0266462 A1* | 9/2015 | Johri | B60W 10/02 701/22 |

FOREIGN PATENT DOCUMENTS

| | | |
|---|---|---|
| JP | 2001-050075 A | 2/2001 |
| JP | 2004-278465 A | 10/2004 |
| JP | 2010-246230 A | 10/2010 |

\* cited by examiner

CONTROL APPARATUS AND ONBOARD SYSTEM

CROSS-REFERENCE TO RELATED APPLICATIONS

The present application is a continuation application of International Application No. PCT/JP2018/018995, filed May 16, 2018, which claims priority to Japanese Patent Application No. 2017-103618, filed May 25, 2017. The contents of these applications are incorporated herein by reference in their entirety.

BACKGROUND

Technical Field

The present disclosure relates to a control apparatus that controls an internal combustion engine and a power generator, and an onboard system.

Background Art

There is known to be a technique of increasing output torque of an engine and increasing exhaust gas temperature to warm up an exhaust gas purification apparatus. In the technique, to increase the exhaust gas temperature in the engine, the output torque is increased, and the increased output torque is used to cause a power generator to generate power. The generated power is stored in a storage battery.

SUMMARY

The present disclosure provides a control apparatus that is used in an onboard system provided to a vehicle. The onboard system includes an internal combustion engine and a power generator. The power generator generates power and supplies the generated power to an electrical load provided to the vehicle. An output torque of the internal combustion engine causes the vehicle to travel and causes the power generator to generate power. The control apparatus controls the output torque of the internal combustion engine based on a power supply request by the electrical load. In response to the output torque being increased based on the power supply request, the control apparatus causes the power generator to generate the power by the output torque, while restricting generated power during an initial period when the output torque is being increased.

DESCRIPTION OF THE EMBODIMENTS

Figure 1:
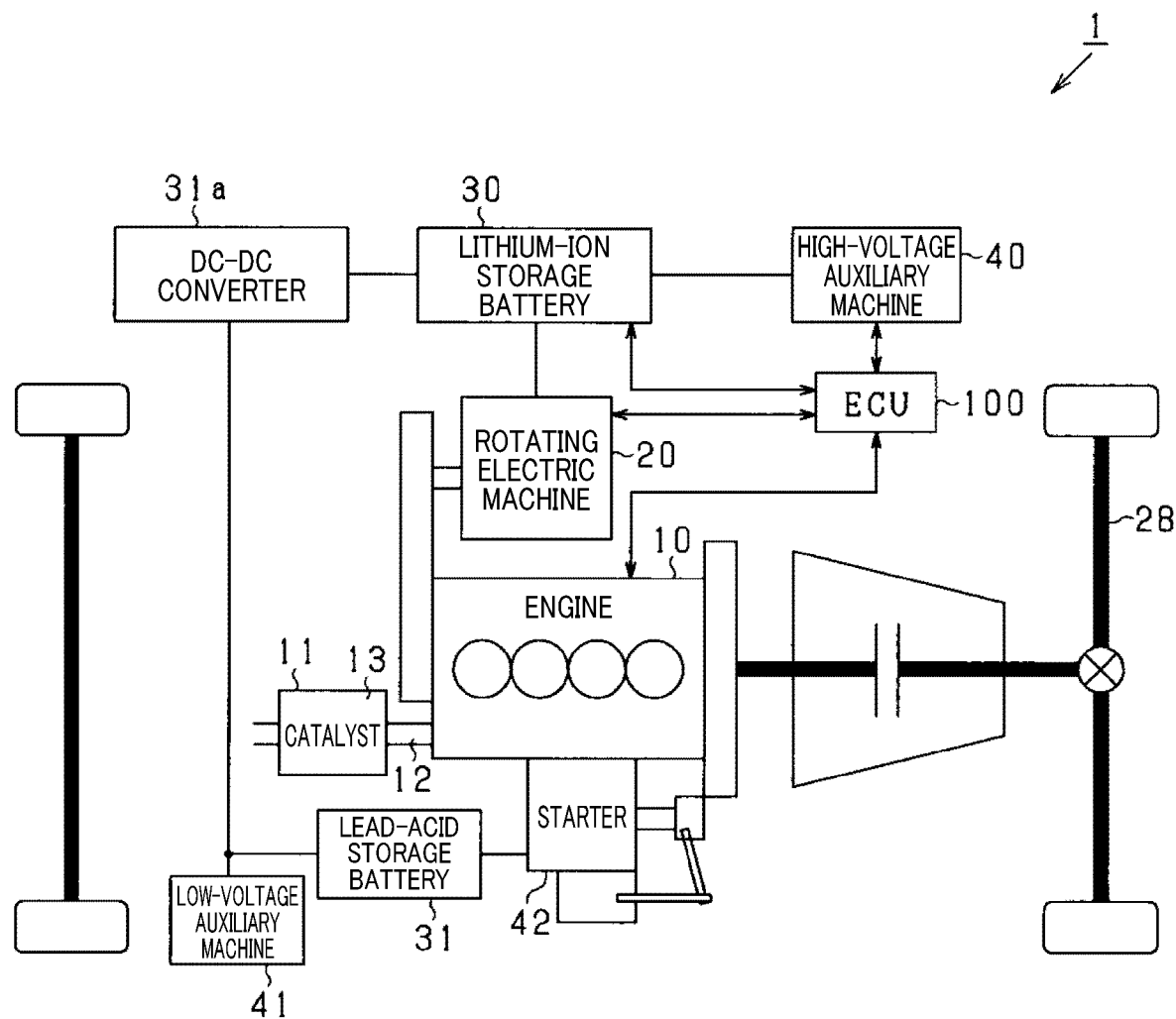
FIG. 1 is a block diagram of an overview of an onboard system.

There is known to be a technique of increasing output torque of an engine and increasing exhaust gas temperature to warm up an exhaust gas purification apparatus (catalyst) is known (for example, JP-A-2007-230475). In the technique, to increase the exhaust gas temperature in the engine, the output torque is increased, and the increased output torque is used to cause a power generator (electric motor) to generate power. The generated power is stored in a storage battery (battery). Deterioration of fuel efficiency is therefore suppressed.

Here, the electric power generated by the power generator is used to drive an electrical load, in addition to being used to charge the storage battery. For example, in a case in which a power supply request is generated in accompaniment with driving of the electrical load, when use of the storage battery is restricted due to a power storage state, a temperature environment, or the like, instead of power supply from the storage battery to the electrical load, supply of generated power from the power generator to the electrical load is performed. In this case, to ensure power generation torque of the power generator, increase in the output torque of the engine is performed.

However, even when the engine is commanded to increase the output torque, time is required for the output torque based on the command to be reached, due to intake delay and the like. Therefore, when the power generation torque, of the output torque, that is used by the power generator to generate power, increases regardless of the output torque not having actually increased immediately after the command, drive torque, of the output torque, that is used for traveling temporarily decreases. When the drive torque that is used for traveling decreases, drivability may decrease. For example, acceleration is not performed as intended by a driver.

It is thus desired to provide a control apparatus that is capable of suppressing decrease in drivability during power generation, and an onboard system.

A first exemplary embodiment provides a control apparatus that is used in an onboard system provided to a vehicle. The onboard system includes an internal combustion engine and a power generator. The power generator generates power and supplies the generated power to an electrical load provided to the vehicle. An output torque of the internal combustion engine causes a vehicle to travel and causes the power generator to generate power.

The control apparatus includes a torque control unit and a power generation control unit. The torque control unit controls the output torque of the internal combustion engine based on a power supply request by the electrical load. In response to the output torque being increased based on the power supply request, the power generation control unit causes the power generator to generate the power by the output torque, while restricting generated power during an initial period when the output torque is being increased.

The output torque of the internal combustion engine causes the vehicle to travel and causes the power generator to generate the power. Therefore, during an increase transition period of the output torque based on a power supply request, if power generation torque that is used for power generation is increased to increase the generated power, unintentional decrease in drive torque that is used for traveling occurs. Here, during the initial period when the increase in the output torque is performed, as a result of the generated power being restricted, decrease in the drive torque accompanying increase in the power generation torque can be suppressed. Consequently, decrease in drivability during power generation can be suppressed.

According to a second exemplary embodiment, the power generation control unit restricts increase in generated power accompanying increase in power generation efficiency of the power generator during the initial period, and increases the power generation efficiency of the power generator and increases the generated power after end of the initial period.

As a result, increase in the voltage that is applied to the electrical load during the initial period can be suppressed. In addition, because the power generation efficiency is increased after the end of the initial period, an increase amount of the output torque can be suppressed.

According to a third exemplary embodiment, the power generation control unit decreases power generation efficiency of the power generator based on an increase amount of the output torque, during the initial period.

As a result, during the initial period, the generated power of the power generator can be suppressed based on the increase amount of the output torque. Therefore, excessive power being supplied to the electrical load can be prevented. Consequently, increase in the voltage that is applied to the electrical load can be suppressed. In addition, the generated power is not wasted.

According to a fourth exemplary embodiment, the control apparatus includes a determining unit that determines end of the initial period based on a comparison between a command increase amount of the output torque that is commanded to the internal combustion engine based on the power supply request and an actual increase amount of the output torque of the internal combustion engine after start of the initial period.

As a result of the command increase amount of the output torque and the actual increase amount of the output torque being compared, whether a delay in the increase in the output torque due to intake delay in the internal combustion engine or the like is resolved can be appropriately determined. That is, the extent of decrease in the drive torque can be appropriately determined. As a result, the end of the initial period can be appropriately determined.

According to a fifth exemplary embodiment, the determining unit determines whether a predetermined output torque is ensured when the generated power is increased based on the power supply request, and determines the end of the initial period based on the determination result.

As a result, even when the generated power is generated based on the power supply request and decrease in the drive torque occurs, the predetermined output torque can be ensured. Therefore, for example, if the configuration is such that an output torque of an extent that stopping of operation of the internal combustion engine can be suppressed is ensured, decrease in drivability based on the stopping of the internal combustion engine can be prevented.

According to a sixth exemplary embodiment, the control apparatus includes a power supply control unit that controls whether the generated power from the power generator is supplied to the electrical load based on the power supply request. The power supply control unit restricts the generated power from being supplied to the electrical load during the initial period.

As a result, during the initial period, the generated power that is supplied to the electrical load can be suppressed, and load on the power generator, that is, increase in the power generation torque can be suppressed.

According to a seventh exemplary embodiment, the control apparatus includes a power supply control unit that is provided with a plurality of electrical loads and controls whether the generated power is supplied to each of a plurality of electrical loads. When the power supply request is issued from a new electrical load while the generated power of the power generator is being supplied to any of the electrical loads, the power supply control unit restricts the generated power from being supplied to the new electrical load during the initial period.

As a result, during the initial period, the generated power that is supplied to the electrical load can be suppressed, and load on the power generator, that is, increase in the power generation torque can be suppressed. Meanwhile, power supply to the electrical load to which the generated power has been supplied from before the initial period can be maintained.

According to an eighth exemplary embodiment, the power supply control unit supplies the generated power to the new electrical load when, during the initial period, an applied voltage of the electrical load to which the generated power has been supplied from before the start of the initial period is equal to or greater than a predetermined determination value.

For example, even in cases in which the power generation efficiency cannot be decreased for some reason and the generated power increases in accompaniment with the increase in the output torque of the internal combustion engine, an overvoltage being applied to the electrical load can be prevented.

According to a ninth exemplary embodiment, the power generation control unit increases the power generation efficiency based on the new power supply request and increases the generated power when, during the initial period, the applied voltage of the electrical load to which the generated power has been supplied from before the start of the initial period is equal to or greater than the predetermined determination value.

As a result, when the generated power is supplied to a new electrical load to prevent application of an overvoltage, the power generation efficiency is increased and the generated power is increased. Therefore, increase in the power generation torque can be suppressed. That is, increase in the power generation torque, of the output torque, is suppressed. Therefore, a change amount of the drive torque can be suppressed.

According to a tenth exemplary embodiment, a storage battery that stores generated power from the power generator is provided in the onboard system. The power generation control unit causes the power generator to generate power when use of the storage battery is restricted.

Electric power can be supplied to the electrical load even when use of the storage battery is restricted. In addition, even when the generated power is supplied to the electrical load, the drive torque that is used for traveling decreasing as a result of the power generation and drivability decreasing can be prevented.

According to an eleventh exemplary embodiment, a purification apparatus that purifies exhaust gas of the internal combustion engine is provided in the onboard system. When the internal combustion engine is being operated to warm up the purification apparatus and the power supply request is issued, the power generation control unit causes the power generator to generate power by the output torque while restricting the generated power during the initial period.

When the internal combustion engine is being operated to warm up the purification apparatus, ordinarily, the drive torque, of the output torque, is set to a minimum. Therefore, when the drive torque is decreased and the power generation torque is increased, the drive torque may be decreased to an extent that the internal combustion engine stops. Therefore, during warmup, during the initial period, increase in the generated power is restricted. As a result, the operation of the internal combustion engine can be continued and warmup can be performed with certainty.

A twelfth exemplary embodiment provides an onboard system provided to a vehicle. The onboard system includes an internal combustion engine and a power generator. The power generator generates power and supplies the generated power to an electrical load provided to the vehicle. The output torque of the internal combustion engine causes the vehicle to travel and causes the power generator to generate power. The onboard system includes the above-described control apparatus.

As a result, decrease in drivability during power generation can be suppressed.

Embodiments will hereinafter be described. Sections that are identical or equivalent to each other among the following embodiments are given the same reference numbers in the drawings. Descriptions of sections having the same reference numbers are applicable therebetween.

As shown in FIG. 1, an onboard system that is mounted in a vehicle 1 includes an engine 10 that serves as an internal combustion engine, a rotating electric machine 20 that serves as a power generator, a lithium-ion storage battery 30 that serves as a storage battery, a high-voltage auxiliary machine 40 that serves as an electrical load, an electronic control unit (ECU) 100 that serves as a control apparatus, and the like.

<Engine 10>

The engine 10 is connected to an exhaust apparatus 11. The exhaust apparatus 11 includes an exhaust manifold 12 and a catalytic apparatus 13 that serves as a purification apparatus. The exhaust manifold 12 is attached to the engine 10 and collects exhaust gas that is discharged from a cylinder (cylinder) of the engine 10. The catalytic apparatus 13 is attached to the exhaust manifold 12 on a downstream side of the exhaust manifold 12. The catalytic apparatus 13 purifies the exhaust gas by a catalyst that is provided inside the apparatus.

<Rotating Electric Machine 20>

For example, the rotating electric machine 20 is a power generator that provides a motor function, and includes a three-phase alternating-current motor and an inverter. The rotating electric machine 20 is configured as an electromechanically-integrated-type integrated starter generator (ISG). The rotating electric machine 20 provides a power generation function for performing power generation (regenerative power generation) through rotation of a crank shaft (output shaft) of the engine 10 or an axel, and a power running function for applying driving force (rotational force) to the crank shaft. Here, for example, a power generator that does not provide the power running function, such as an alternator, may be used instead of the rotating electric machine 20.

<Lithium-Ion Storage Battery 30>

The lithium-ion storage battery 30 is connected to the rotating electric machine 20. In addition, a lead-acid storage battery 31 is connected to the lithium-ion storage battery 30 with a direct current-to-direct current (DC-DC) converter 31a therebetween. Rated voltages of the storage batteries 30 and 31 differ. For example, the rated voltage of the lithium-ion storage battery 30 is a high voltage (48 V) and the rated voltage of the lead-acid storage battery 31 is a low voltage (12 V). In addition, the storage batteries 30 and 31 can be charged by the rotating electric machine 20.

Here, the rotating electric machine 20 and the lead-acid storage battery 31 are connected to the lithium-ion storage battery 30 in parallel. However, the manner of connection may be arbitrarily modified. For example, the lithium-ion storage battery 30 and the lead-acid storage battery 31 may be connected to the rotating electric machine 20 in parallel.

The lead-acid storage battery 31 is a known general-purpose storage battery. In contrast, the lithium-ion storage battery 30 is a high-density storage battery that has less power loss during charging and discharging, and higher output density and energy density, compared to the lead-acid storage battery 31. The lithium-ion storage battery 30 is preferably a storage battery that has higher energy efficiency during charging and discharging than the lead-acid storage battery 31. In addition, the lithium-ion storage battery 30 is configured as an assembled battery each configured to include a plurality of unit batteries.

<High-Voltage Auxiliary Machine 40>

The high-voltage auxiliary machine 40 is an electrical load to which electric power is supplied from the rotating electric machine 20 and the lithium-ion storage battery 30. The high-voltage auxiliary machine 40 is an electrical apparatus that is mounted in the vehicle 1. For example, the high-voltage auxiliary machine 40 is an air-conditioning apparatus. A plurality of high-voltage auxiliary machines 40 are provided.

In addition, the vehicle 1 is also provided with a low-voltage auxiliary machine 41 and a starter 42. The low-voltage auxiliary machine 41 is connected to the lead-acid storage battery 31 and is supplied electric power from the lead-acid storage battery 31. The starter 42 is connected to the lead-acid storage battery 31 and starts the engine 10. The low-voltage auxiliary machine 41 is an electrical apparatus that is mounted in the vehicle 1. For example, the low-voltage auxiliary machine 41 is an ECU, headlights, audio, or power windows. A plurality of low-voltage auxiliary machines 41 are provided. Voltages of the electric power supplied to the high-voltage auxiliary machine 40 and the low-voltage auxiliary machine 41 differ. The starter 42 is supplied electric power from the lead-acid storage battery 31 at startup of the engine 10.

<ECU 100>

The ECU 100 includes a central processing unit (CPU) and a memory that serves as a storage unit. Various functions provided by the ECU 100 are actualized by the CPU running a program stored in the memory. Here, the various functions may be actualized by an electronic circuit that is hardware. Alternatively, at least some of the various functions may be actualized by software, that is, a process that is performed on a computer. In addition, for example, a plurality of ECUs may be provided for each function, each control subject, or each process.

Figure 2:
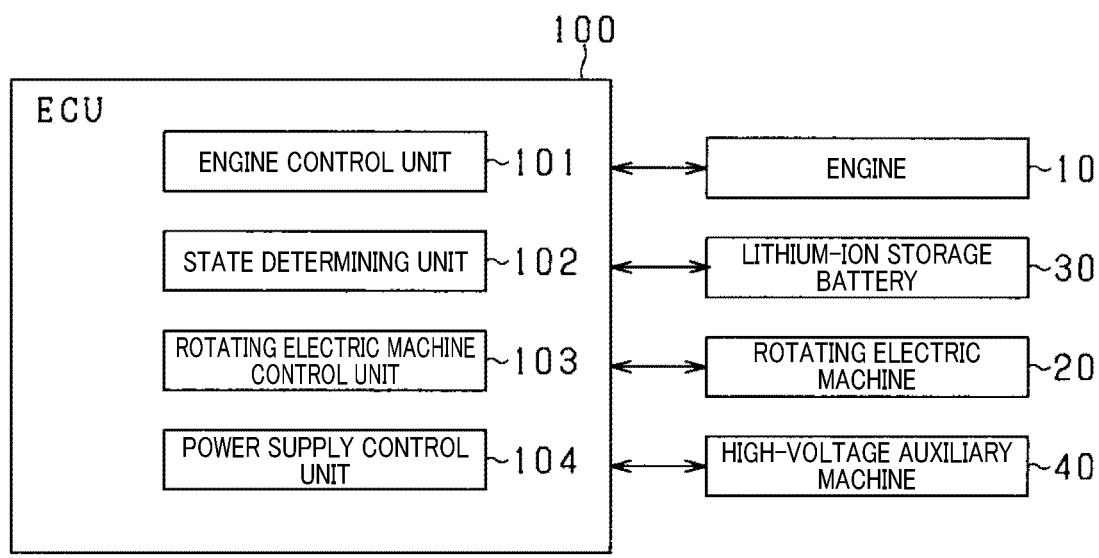
FIG. 2 is a block diagram of functions of an ECU.

As shown in FIG. 2, as the functions provided by the ECU 100, for example, a function as an engine control unit 101 (torque control unit) that controls an output torque of the engine 10 can be given. More specifically, the engine control unit 101 controls the engine 10 so as to increase and decrease the output torque based on control information such as an operating amount of an accelerator pedal or a power supply request from the high-voltage auxiliary machine 40. For example, the engine control unit 101 controls the engine 10 so as to increase and decrease the output torque based on increase and decrease in the operating amount of the accelerator pedal. In addition, the engine control unit 101 controls the engine 10 so as to increase and decrease the output torque based on increase and decrease in the generated power that is generated based on the power supply request.

In addition, for example, as the functions provided by the ECU 100, a function as a state determining unit 102 that determines whether the lithium-ion storage battery 30 is in a state that can be used without restriction can be given. Specifically, the state determining unit 102 acquires a battery state (such as a temperature) of the lithium-ion storage battery 30. The state determining unit 102 then determines whether the lithium-ion storage battery 30 is in a state that can be used without restriction based on the acquired battery state. For example, when the lithium-ion storage battery 30 is in a very low temperature state (or a very high temperature state), the state determining unit 102 determines that use of the lithium-ion storage battery 30 is restricted. In addition, for example, the state determining unit 102 acquires a state of a switch that is provided to control charging and discharge of the lithium-ion storage battery 30. The state determining unit 102 then determines whether the lithium-ion storage battery 30 is in a state that can be used without restriction based on the acquired state of the switch. For example, when an abnormality (such as a failure) is present in the switch, the state determining unit 102 determines that use of the lithium-ion storage battery 102 is restricted.

Furthermore, as the functions provided by the ECU 100, for example, a function as a rotating electric machine control unit 103 (power generation control unit) that controls power generation of the rotating electric machine 20 can be given. More specifically, the rotating electric machine control unit 103 causes the rotating electric machine 20 to generate power (regenerative power) when the lithium-ion storage battery 30 is in a usable state and regenerative power generation is able to be performed (such as during deceleration of the vehicle 1). In addition, although described in detail hereafter, the rotating electric machine control unit 103 may also cause the rotating electric machine 20 to generate power based on a power supply request from the high-voltage auxiliary machine 40.

In addition, the rotating electric machine control unit 103 also provides a function for changing power generation efficiency of the rotating electric machine 20 during power generation and increasing or decreasing generated power. The power generation efficiency refers to efficiency of energy (generated power) that is acquired in relation to energy (mechanical input) that is used by the rotating electric machine 20 for power generation. For example, the rotating electric machine control unit 103 is configured to be capable of changing the power generation efficiency by a known method, such as by performing current vector control via the inverter.

As the functions provided by the ECU 100, a function as a power supply control unit 104 that controls whether to supply generated power to the high-voltage auxiliary machine 40 can be given. More specifically, the power supply control unit 104 supplies generated power from the rotating electric machine 20 to the high-voltage auxiliary machine 40 at a predetermined timing based on a power supply request from the high-voltage auxiliary machine 40. For example, the power supply control unit 104 causes generated power to be supplied to the high-voltage auxiliary machine 40 that has issued the power supply request by issuing a command that allows supply of generated power to the high-voltage auxiliary machine 40. Here, the power supply control unit 104 is configured to be capable of controlling whether to supply generated power to each high-voltage auxiliary machine 40.

Here, when the generated power of the rotating electric machine 20 is increased, instead of the power generation torque, of the output torque, that is used for power generation increasing, the drive torque that is used for traveling may decrease. Here, a case in which the output torque of the engine 10 is increased to increase generated power in accompaniment with a power supply request from the high-voltage auxiliary machine 40 will be described as an example with reference to FIG. 3. In this case, as a result of intake delay in the engine 10 or the like, time is required from when an increase command regarding the output torque is issued (time T1) until when an actual increase amount of the output torque reaches a command increase amount (time T3). That is, even when the increase command to the engine 10 regarding the output torque is issued, the output torque does not instantly increase. In actuality, the actual increase amount of the output torque gradually increases from when the increase command is issued, until the command increase amount is reached.

Figure 3:
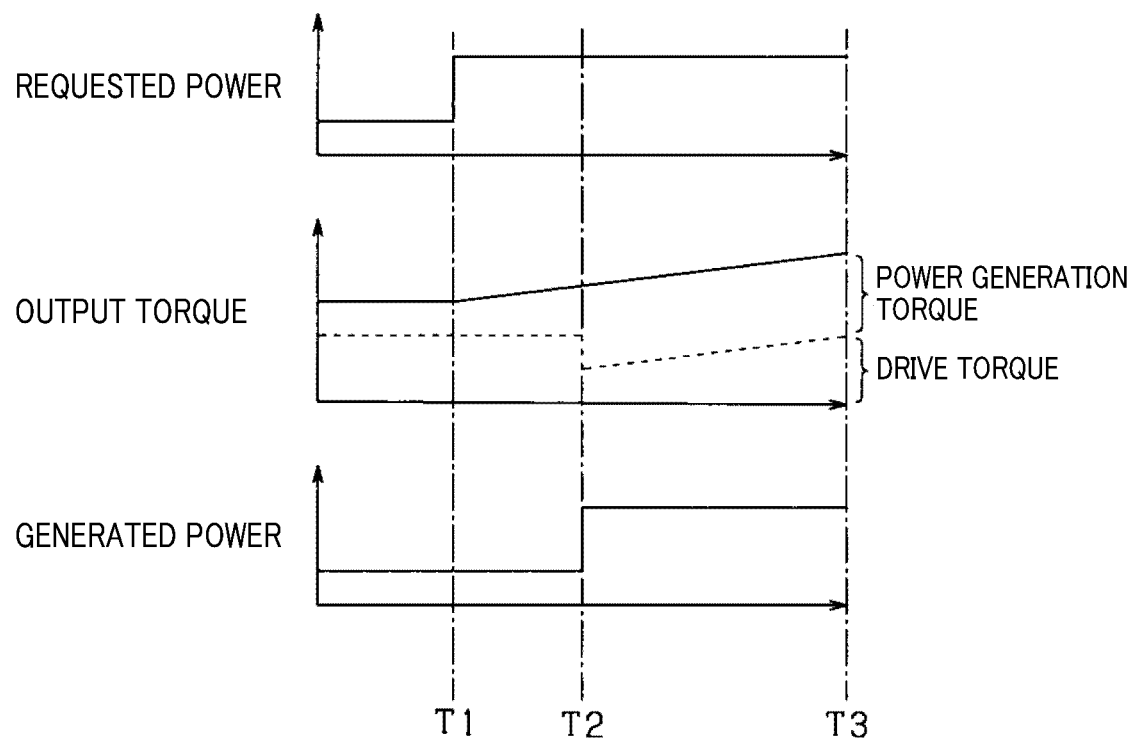
FIG. 3 is a timing chart of an aspect of changes in output torque.

Therefore, at time T2 at which the output torque is being increased (during an increase transition period), if the power generation torque is increased to increase the generated power (such as load on the rotating electric machine 20 being increased by generated power being supplied to a new electrical load), instead, the drive torque that is used for traveling decreases. In FIG. 3, changes in the drive torque are indicated by a broken line in a graph of the output torque. That is, the power generation torque is between a solid line and the broken line, and the drive torque is at and below the broken line.

Figure 4:
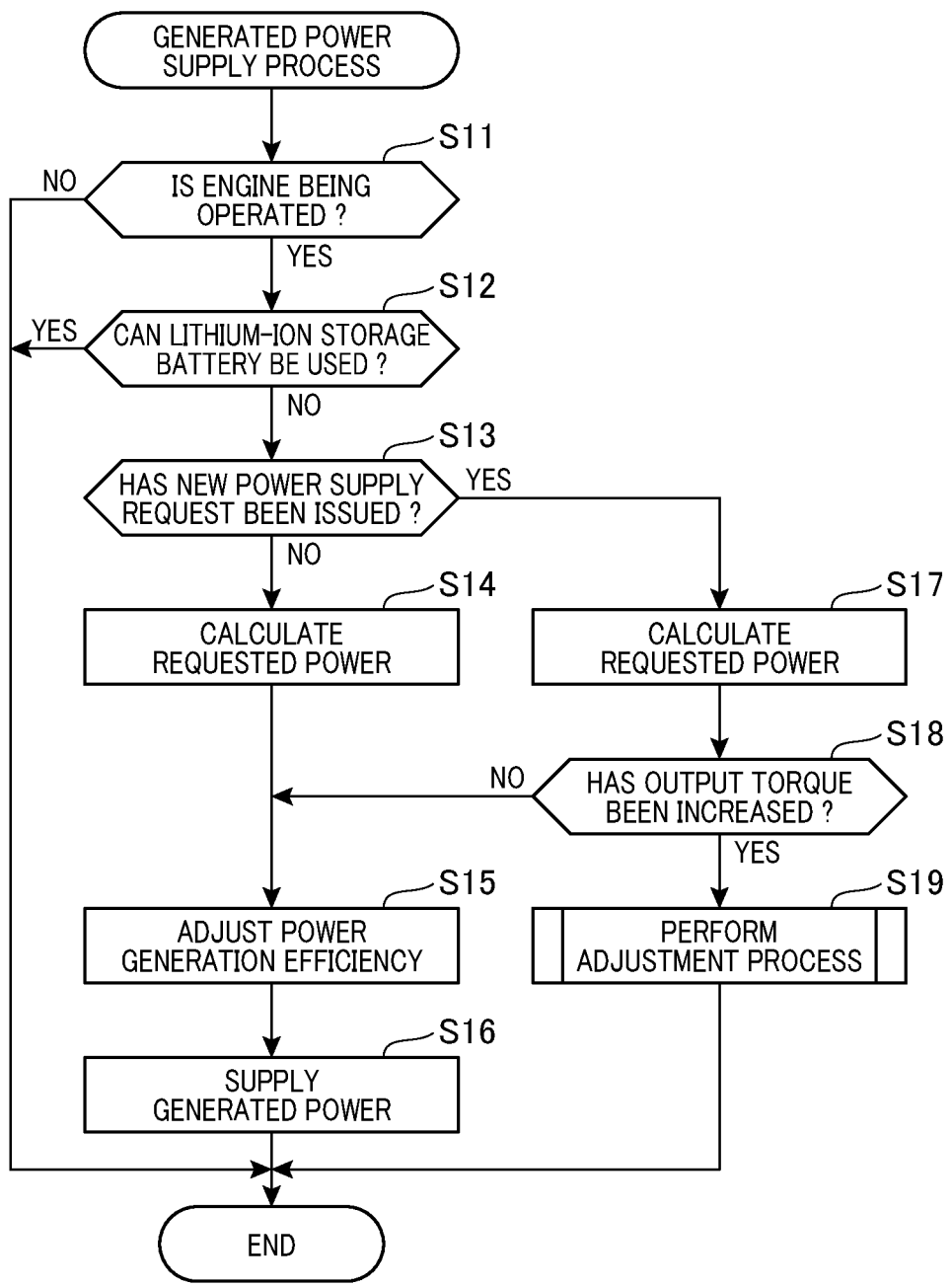
FIG. 4 is a flowchart of a generated power supply process.

When the drive torque decreases, drivability may decrease. For example, the vehicle 1 may not accelerating in comparison to the operating amount of the accelerator pedal. Therefore, to prevent decrease in drivability, a generated power supply process shown in FIG. 4 is performed when the generated power is increased. The generated power supply process is performed by the ECU 100 at every predetermined cycle.

The ECU 100 determines whether the engine 10 is being operated (in the midst of operation) (step S11). When determined that the engine 10 is not being operated (NO at step S11), the ECU 100 ends the generated power supply process.

When determined that the engine 10 is being operated (YES at step S11), the ECU 100 determines whether the lithium-ion storage battery 30 is in a state that can be used without restriction (step S11). At step S11, the ECU 100 functions as the state determining unit 102. When determined that the lithium-ion storage battery 30 is in a state that can be used without restriction (YES at step S11), the ECU 100 ends the generated power supply process.

Here, when determined that the engine 10 is not being operated (NO at step S11) or the lithium-ion storage battery 30 is in a usable state (YES at step S12), the ECU 100 causes electric power to be supplied from the lithium-ion storage battery 30 when electric power is supplied to the high-voltage auxiliary machine 40.

When determined that use of the lithium-ion storage battery 30 is restricted (NO at step S12), the ECU 100 determines whether a new power supply request based on driving of the high-voltage auxiliary machine 40 is issued from the high-voltage auxiliary machine 40 (step S13). Here, the new power supply request includes an initial power supply request after the start of operation of the engine 10.

When determined that a new power supply request is not issued (NO at step S13), the ECU 100 calculates requested power that is requested by the high-voltage auxiliary machine 40, based on the power supply request from the high-voltage auxiliary machine 40 (step S14). Here, when power supply requests from a plurality of high-voltage auxiliary machines 40 are received, the ECU 100 calculates the requested power by calculating the electric power requested from each high-voltage auxiliary machine 40 and adding the calculated electric power.

Then, the ECU 100 adjusts the power generation efficiency of the rotating electric machine 20 such that generated power corresponding to the calculated requested power is generated, and causes the rotating electric machine 20 to generate electric power (step S15). That is, the ECU 100 causes the rotating electric machine 20 to generate the generated power corresponding to the requested power by changing the power generation efficiency while maintaining a current power generation torque, that is, ensuring that the load on the rotating electric machine 20 is not changed. According to the present embodiment, the generated power corresponding to the requested power refers to generated power that is equal to the requested power or generated power that is slightly greater than the requested power.

For example, when the requested power is greater than the generated power at the time the power supply request is issued, the ECU 100 increases the power generation efficiency and enables power that corresponds to the requested power to be generated. Meanwhile, when the requested power is less than the generated power at the time the power supply request is issued, the ECU 100 decreases the power generation efficiency and enables power that corresponds to the requested power to be generated. Here, at step S15, when the requested power is not changed, the power generation efficiency of the rotating electric machine 20 is maintained and the generated power is maintained.

That is, as a result of steps S14 and S15, the ECU 100 adjusts the power generation efficiency of the rotating electric machine 20 based on the power supply request from the high-voltage auxiliary machine 40, and causes the rotating electric machine 20 to generate electric power.

Subsequently, the ECU 100 supplies the generated power of the rotating electric machine 20 to the high-voltage auxiliary machine 40 that has issued the power supply request (step S16). That is, the ECU 100 allows the generated power of the rotating electric machine 20 to be supplied to the high-voltage auxiliary machine 40 that has issued the power supply request. As a result, the high-voltage auxiliary machine 40 that has issued the power supply request receives input of the generated power and is driven. In addition, when a plurality of high-voltage auxiliary machines 40 to be driven are present, the ECU 100 supplies the generated power to each of the high-voltage auxiliary machines 40 to be driven. Then, the ECU 100 ends the generated power supply process.

Here, when determined that a new power supply request is not issued (NO at step S13), the processes at steps S14 to S15 may be omitted if changes to the generated power or changes to a supply destination are not required.

Meanwhile, when determined that a new power supply request is issued (YES at step S13), the ECU 100 calculates the requested power to be supplied to the high-voltage auxiliary machine 40, based on the power supply request from the high-voltage auxiliary machine 40, in a manner similar to that described above (step S17).

Then, the ECU 100 determines whether the output torque of the engine 10 is required to be increased (step S18). Specifically, the ECU 100 determines whether the generated power corresponding to the calculated requested power can be generated by increasing the power generation efficiency so as to maintain the current power generation torque, that is, such that the load on the rotating electric machine 20 is not changed. For example, the ECU 100 determines whether generated power that is equal to or greater than the calculated requested power can be generated when the power generation efficiency of the rotating electric machine 20 is maximized at the current power generation torque.

When determined that the output torque of the engine 10 is required to be increased (YES at step S18), the ECU 100 proceeds to an adjustment process at step S19. Meanwhile, when determined that the output torque of the engine 10 is not required to be increased (NO at step S18), the ECU 100 proceeds to the process at step S15, described above.

Figure 5:
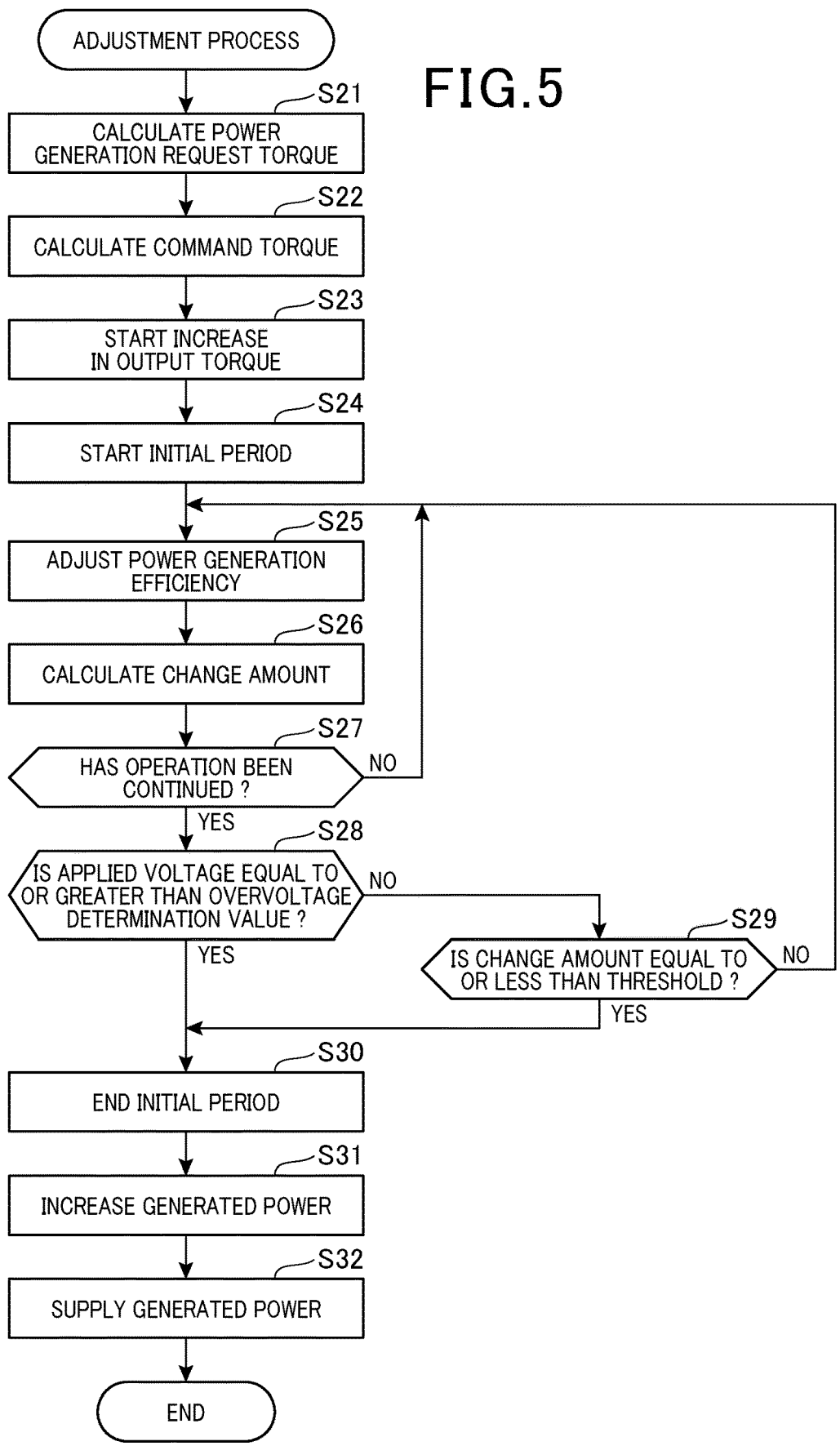
FIG. 5 is a flowchart of an adjustment process.

Next, the adjustment process shown in step S19 will be described with reference to FIG. 5. First, the ECU 100 calculates a power generation request torque that is requested from the rotating electric machine 20 to generate the generated power that corresponds to the requested power that is calculated at step S17 based on the power supply request, when the power generation efficiency of the rotating electric machine is maximized (step S21).

Then, the ECU 100 calculates an output torque (command torque) that is commanded to the engine 10 by adding a drive request torque to the calculated power generation request torque (step S22). For example, the drive request torque can be calculated based on control information such as the operating amount of the accelerator pedal.

Next, the ECU 100 controls the output torque of the engine 10 based on the calculated command torque (step S23). That is, at step S23, the ECU 100 performs control to increase the output torque of the engine 10 until the output torque coincides with the command torque or is slightly greater than the command torque.

Then, the ECU 10 starts an initial period from the time at which the increase in the output torque of the engine 10 is started (step S24). For example, the time at which the increase in the output torque is started is the time at which the increase in the output torque is commanded to the engine 10. In addition, the time at which the increase in the output torque is started may be the time at which the ECU 100 starts increase control of the output torque of the engine 10.

During this initial period, the ECU 100 causes the rotating electric machine 20 to generate power while restricting the generated power. That is, the ECU 100 restricts the rotating electric machine 20 from generating the generated power that is requested by the new power supply request. In other words, at step S24, the ECU 100 starts restriction of the generated power. As a result, during the initial period, the generated power that corresponds to the calculated requested power is no longer generated.

More specifically, during the initial period, the ECU 100 restricts the increase in the power generation efficiency of the rotating electric machine 20 based on the power supply request. In addition, during the initial period, the ECU 10 restricts the supply of generated power to the high-voltage auxiliary machine 40 based on the new power supply request during the initial period. As a result, the ECU 100 restricts increase in the power generation torque (the load on the rotating electric machine 20).

Here, during the initial period, when the drive torque that is used for traveling of the vehicle 1 is fixed, the power generation torque that is used by the rotating electric machine 20 increases in accompaniment with the increase in the output torque. In addition, the ECU 100 continuously supplies generated power to the high-voltage auxiliary machine 40 that has been supplied generated power from before the initial period. That is, the ECU 100 maintains the supply of generated power to the high-voltage auxiliary machine 40 based on the power supply request that precedes the current power supply request.

Here, ordinarily, during operation of the engine 10, that is, while ignition is on, at least some of the plurality of high-voltage auxiliary machines 40 are driven. Even during the initial period, generated power is continuously supplied to these high-voltage auxiliary machines 40. Meanwhile, as described above, during the initial period, if the output torque increases when the drive torque is fixed, the power generation torque increases.

Therefore, during the initial period, the generated power increases in accompaniment with the increase in the power generation torque unless the power generation efficiency is changed. Meanwhile, during the initial period, the ECU 100 restricts the supply of generated power to the high-voltage auxiliary machine 40 based on the new power supply request. Therefore, the generated power that is supplied to the high-voltage auxiliary machine 40 that has been driven from before the initial period increases. In this case, even when the generated power increases, a current that is supplied to the high-voltage auxiliary machine 40 does not change. Therefore, applied voltage increases and overvoltage may occur.

Therefore, during the initial period, the ECU 100 adjusts the power generation efficiency of the rotating electric machine 20 based on the output torque (current output torque) of the engine 20 (step S25). More specifically, the ECU 100 reduces the power generation efficiency so as to be inversely proportional to the actual increase amount of the output torque (the increase amount of the power generation torque) from the start of the initial period, and fixes the generated power of the rotating electric machine 20. That is, the ECU 100 adjusts the change amount of the power generation efficiency based on the actual increase amount of the output torque from the start of the initial period, and fixes the generated power of the rotating electric machine 20.

Regarding the output torque, an estimation value thereof can be calculated by the ECU 100 based on information acquired from a detecting unit that detects the state of the engine 10 (such as throttle opening, engine rotation speed, and pressure inside the cylinder (combustion pressure)). Here, a torque sensor that is capable of detecting the output torque of the engine 10 may be provided and the output torque may be acquired from the torque sensor.

Therefore, the actual increase amount of the output torque can be identified by the output torque at the start of the initial period being stored, and the output torque (the output torque at the start) and the output torque (current output torque) calculated based on the state of the engine 10 being compared. The current output torque is preferably acquired during the process at step S25.

Here, a range over which the power generation efficiency can be varied is determined in advance. Therefore, when the power generation efficiency is adjusted to be minimized, the power generation efficiency cannot be subsequently reduced. Consequently, even during the initial period, when the power generation torque increases after the power generation efficiency is minimized, the generated power of the rotating electric machine 20 may increase and the applied voltage of the high-voltage auxiliary machine 40 may increase.

Next, the ECU 100 calculates a change amount of the drive torque based on a comparison between the command increase amount of the output torque of which output is commanded to the engine 10 based on the power supply request and the actual increase amount of the output toque after the start of the initial period (step S26). That is, to enable power corresponding to the requested power to be generated, a reduction amount of the drive torque when the power generation efficiency is increased and the power generation torque (the load on the rotating electric machine 20) is increased is calculated.

The process at step S26 will be described in detail. The ECU 100 calculates the command increase amount by subtracting the output torque at the start of the initial period from the command torque that is calculated at step S22.

Here, the command increase amount may be calculated by the power generation torque at the start of the initial period being subtracted from the power generation request torque. The command increase amount may be calculated at the start of the initial period, stored in the storage unit, and read.

Next, the ECU 100 calculates the actual increase amount (actual increase amount) of the output torque from the start of the initial period. For example, the actual increase amount of the output torque is calculated by the output torque at the start of the initial period being subtracted from the current output torque. Then, the ECU 100 calculates the change amount of the drive torque that is used for traveling by subtracting the actual increase amount from the command increase amount.

Next, the ECU 100 determines whether at least operation of the engine 10 is continued even when the drive torque decreases (step S27). At step S27, for example, the ECU 100 determines whether operation is continued based on whether the torque obtained by subtracting the change amount from the drive torque is equal to or greater than a predetermined value.

Here, the predetermined value is prescribed by a minimum required output torque for continuing operation of the engine 10. According to the present embodiment, the predetermined value is slightly higher than the minimum required output torque.

When determined that operation is continued (YES at step S27), the ECU 100 acquires the applied voltage of each high-voltage auxiliary machine 40 detected by the voltage sensor and the like and determines whether any of the applied voltages of the high-voltage auxiliary machines 40 is equal to or greater than an overvoltage determination value (step S28). The overvoltage determination value is set in advance based on a value at which a malfunction in the high-voltage auxiliary machine 40 may occur, if a voltage that is equal to or higher than this value is applied.

As described above, during operation of the engine 10, at least some of the plurality of high-voltage auxiliary machines 40 are driven, and the generated power is supplied to these high-voltage auxiliary machines 40 from before the start of the initial period. In principle, during the initial period, the generated power is adjusted so as to be fixed by the process at step S25, even when the power generation torque increases. However, at step S25, after the power generation efficiency is minimized, the power generation efficiency cannot be subsequently reduced. Therefore, the generated power may increase and in accompaniment, the applied voltage may become equal to or greater than the overvoltage determination value. Therefore, at step S28, the ECU 100 determines whether there is risk of the applied voltage becoming an overvoltage.

When determined that the applied voltage is not equal to or greater than the overvoltage determination value (NO at step S28), the ECU 100 determines whether the change amount of the drive torque calculated at step S26 is equal to or less than a threshold (step S29). The threshold is set based on the change amount of the drive torque that is used for traveling at which drivability is assumed not to decrease. For example, the threshold may be 0 or a value near 0.

When determined that the applied voltage is equal to or greater than the overvoltage determination value (YES at step S28) or the change amount of the drive torque is equal to or less than the threshold (YES at step S29), the ECU 100 determines that the initial period has ended (step S30) and increases the generated power so as to be the generated power that corresponds to the requested power (step S31). That is, the ECU 100 cancels (ends) the restriction on the generated power at step S30, increases the power generation efficiency, and causes the rotating electric machine 20 to generate the generated power that is requested through the power supply request. More specifically, the ECU 100 maximizes the power generation efficiency and causes the rotating electric machine 20 to generate generated power.

Then, the ECU 100 supplies the high-voltage auxiliary machine 40 with the generated power of the rotating electric machine 20 based on the power supply request (step S32). Subsequently, the ECU 100 ends the adjustment process.

Meanwhile, when determined that operation is not continued (NO at step S27) or the change amount of the drive torque is not equal to or lower than the threshold (NO at step S29), the ECU 100 proceeds to the process at step S25 again after elapse of a fixed amount of time.

As a result of the processes at steps S16 and S32, the ECU 100 functions as the power supply control unit 104. In addition, as a result of the process at step S23, the ECU 100 functions as the engine control unit 101. Furthermore, as a result of the processes at steps S15, S25, and S31, the ECU 100 functions as the rotating electric machine control unit 103.

Figure 6:
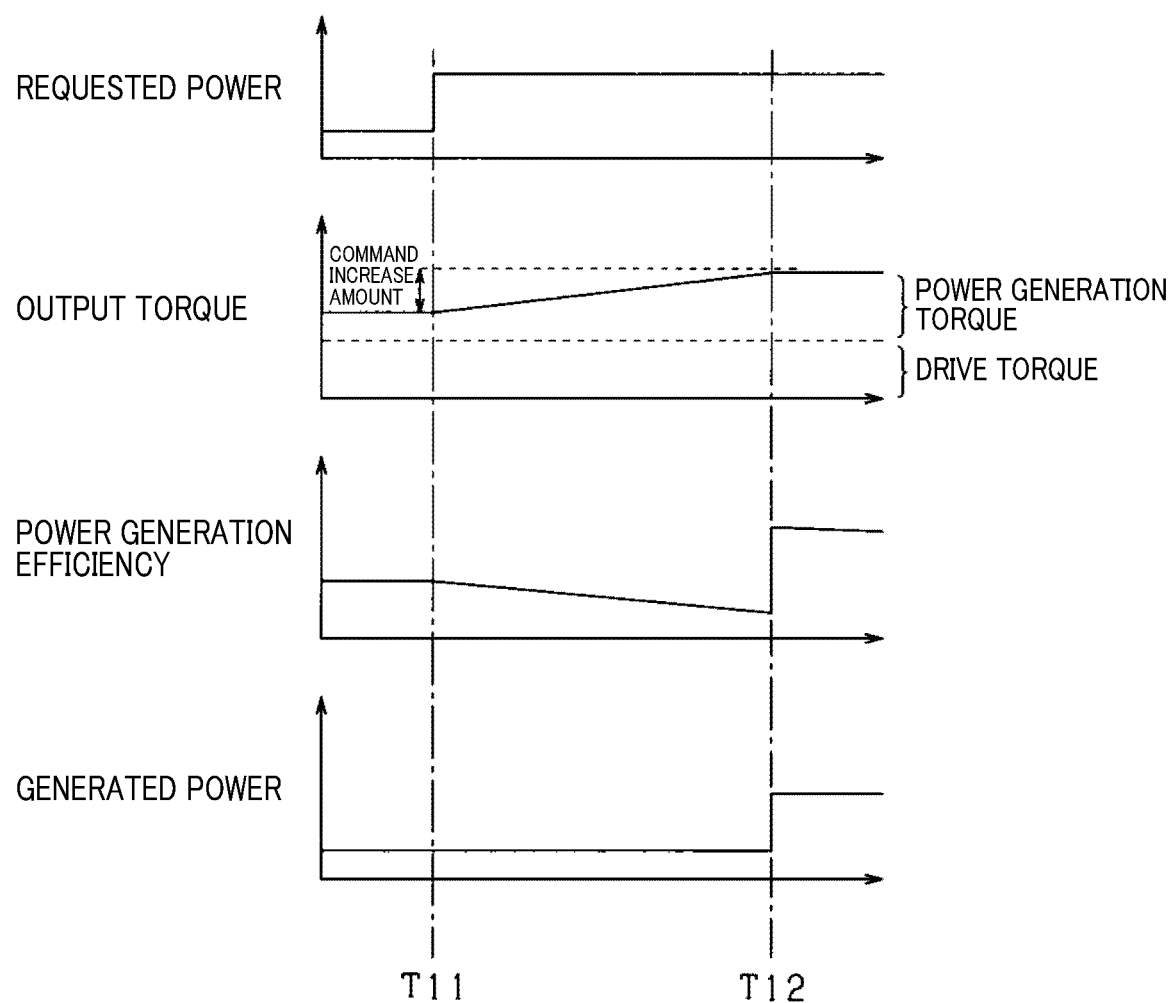
FIG. 6 is a timing chart of an aspect of changes in the output torque and a timing for increase in generated power.
Figure 7:
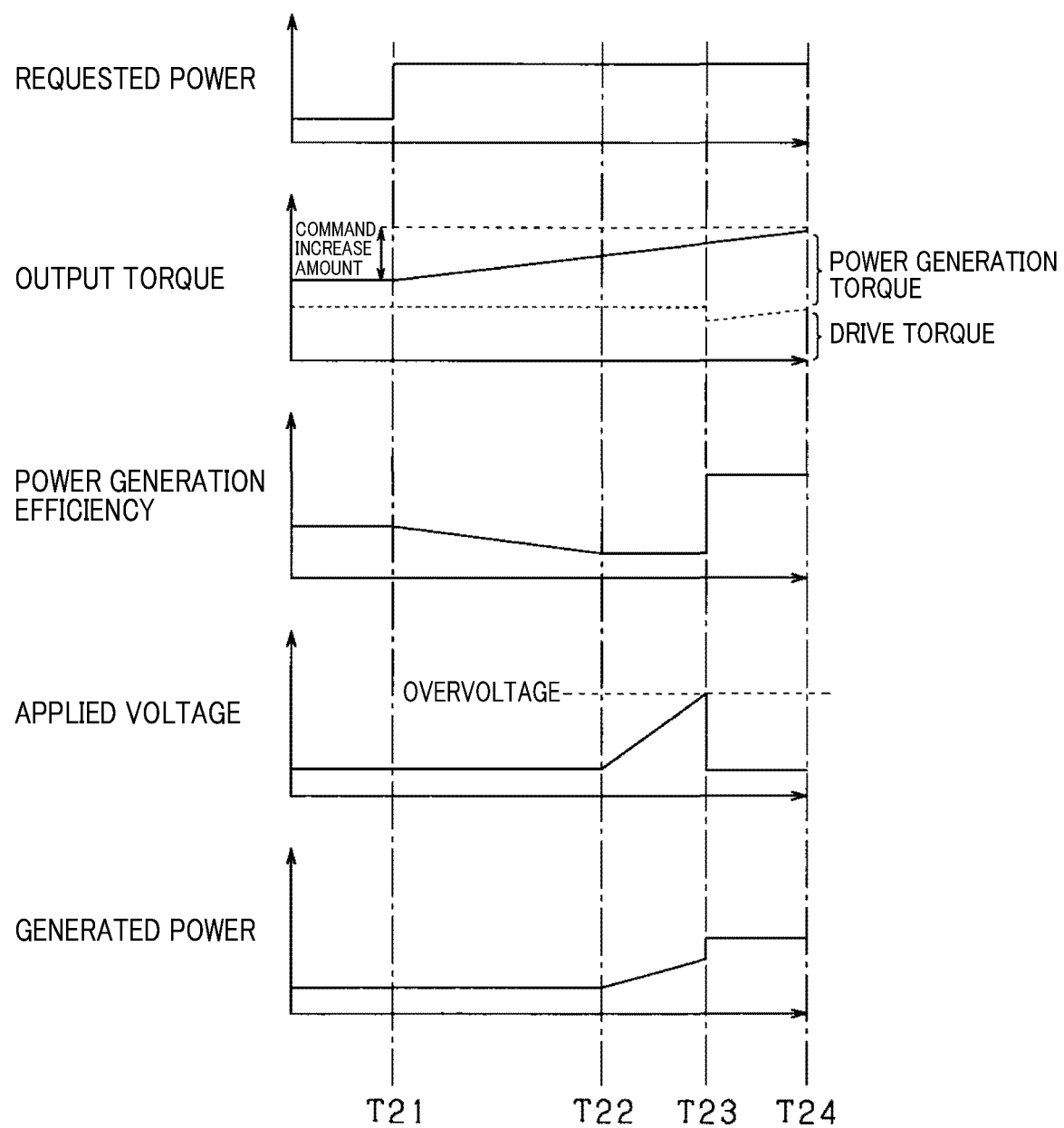
FIG. 7 is a timing chart of an aspect of changes in the output torque and the timing for increase in generated power.

Next, an increase timing of the generated power and the changes in the output torque will be described with reference to the timing charts shown in FIG. 6 and FIG. 7. FIG. 6 and FIG. 7 describe the increase timing of the generated power and an aspect of changes in the output torque when the power generation torque is required to be increased based on a new power supply request. That is, the description is given under a premise that a determination that the output torque is required to be increase has been made at step S18. In FIG. 6 and FIG. 7, a broken line indicates the drive torque in the graph of the output torque. That is, the power generation torque is between a solid line and the broken line. The drive torque is at and below the broken line. In addition, in FIG. 6, the description is given under a premise that the generated power can be fixed by the power generation efficiency being reduced, even when the output torque is increased, during the initial period.

As shown in FIG. 6, the increase in the output torque of the engine 10 is started in accompaniment with the increase in the requested power that is requested through the new power supply request (time T11). That is, at time T11, the initial period starts. At time T11, the actual increase amount of the output torque of the engine 10 is zero. Therefore, at time T11, the change amount of the drive torque is equal to the command increase amount.

During the initial period (time T11 to time T12), the output torque of the engine 10 gradually increases. During this period, the ECU 100 decreases the power generation efficiency and maintains the generated power so as to be fixed. Therefore, during the initial period (time T11 to time T12), even if the output torque of the engine 10 increases, increase in the applied voltage to the high-voltage auxiliary machine 40 can be suppressed and overvoltage being applied can be prevented.

At time T12, the description is given such that, even when the generated power corresponding to the requested power is generated, the operation of the engine 10 is continued and the change amount of the drive torque is equal to or less than the threshold. At time T12, the ECU 100 determines that the initial period has ended. The ECU 100 maximizes the power generation efficiency and increases the generated power. In addition, the ECU 100 supplies each high-voltage auxiliary machine 40 with the generated power based on the power supply request.

At time T12, based on the high-voltage auxiliary machine 40 being supplied with the generated power based on the new power supply request, the load on the rotating electric machine 20 may increase and the power generation torque may increase. However, even in this case, as a result of the premise, the drive torque is equal to or greater than the minimum required torque for continuing the operation of the engine 10, and the operation of the engine 10 can be continued with certainty. In addition, at time T12, even if the power generation torque increases, as a result of the premise, the change amount of the drive torque is equal to or less than the threshold. Therefore, decrease in drivability can be suppressed.

Next, the description is given with reference to FIG. 7. In FIG. 7, the description is given under a premise that the power generation efficiency is minimized during increase in the output torque.

As shown in FIG. 7, the increase in the output torque of the engine 10 is started in accompaniment with the increase in the requested power that is requested through the new power supply request (time T21). That is, at time T21, the initial period starts. At time T21, the actual increase amount of the output torque of the engine 10 is zero. Therefore, at time T21, the change amount of the drive torque is equal to the command increase amount.

Between time T21 and time T22 of the initial period, the output torque of the engine 10 increases. During this period, the power generation efficiency is decreased and the generated power is maintained so as to be fixed. Therefore, during this initial period (time T21 to time T22), even if the output torque of the engine 10 increases, increase in the applied voltage of the high-voltage auxiliary machine 40 is suppressed and overvoltage being applied can be prevented.

However, as indicated in the premise, at time T22, the power generation efficiency minimized. Therefore, at time T22 and subsequent thereto, the generated power also increases in accompaniment with the increase in the output torque (that is, in accompaniment with the increase in the power generation torque). Therefore, the applied voltage of the high-voltage auxiliary machine 40 to which the generated power has been supplied from before the start of the initial period increases.

At time T23, the description is given such that, even when the generated power corresponding to the requested power is generated, the operation of the engine 10 is continued and the applied voltage is determined to be equal to or greater than the overvoltage determination value. At time T23, when determined that the applied voltage is equal to or greater than the overvoltage determination value, even when the change amount of the drive torque is not equal to or less than the threshold, the ECU 100 determines that the initial period has ended. The ECU 100 maximizes the power generation efficiency and increases the generated power. In addition, the ECU 100 supplies each high-voltage auxiliary machine 40 with the generated power based on the power supply request. As a result, the applied voltage decreases in accompaniment with the generated power being supplied to a new high-voltage auxiliary machine 40, and the applied voltage becoming an overvoltage is resolved. In addition, because the power generation efficiency is increased, the power generation torque becoming large is suppressed. Decrease in drive torque is suppressed.

Here, at time T23, based on the high-voltage auxiliary machine 40 being supplied with the generated power based on the new power supply request, the load on the rotating electric machine 20 increases and the power generation torque increases. However, even in this case, as a result of the premise, the drive torque is equal to or greater than the minimum required torque for continuing the operation of the engine 10. Therefore, the operation of the engine 10 can be continued with certainty. That is, the engine 10 stopping and drivability decreasing based on the stopping of the engine 10 can be prevented.

In addition, at time T32 and subsequent thereto as well, the output torque gradually increases until the actual increase amount becomes equal to the command increase amount (time T24). As a result, the drive torque is recovered.

As a result of that described above, the following excellent effects can be achieved.

Traveling of the vehicle 1 and power generation of the rotating electric machine 20 are performed by the output torque of the engine 10. Therefore, during an increase transition period of the output torque based on a power supply request, if the power generation torque that is used for power generation is increased to increase generated power, unintentional decrease in the drive torque that is used for traveling occurs. Here, during the initial period when increase in the output torque is performed based on the power supply request, the ECU 100 restricts generated power (steps S24 to S30). As a result, during the initial period, increase in the power generation torque can be restricted and decrease in the drive torque can be suppressed. Consequently, decrease in drivability during power generation can be suppressed.

During the initial period, the ECU 100 restricts increase in the power generation efficiency of the rotating electric machine 20 based on the power supply request. As a result, during the initial period, increase in the voltage that is applied to the high-voltage auxiliary machine 40 can be suppressed.

In addition, after the end of the initial period, the ECU 100 increases the power generation efficiency of the rotating electric machine 20 based on the power supply request and increases generated power (step S31). As a result, the increase amount (command increase amount) of the output torque can be suppressed and the initial period can be shortened.

During the initial period, the ECU 100 gradually decreases the power generation efficiency based on the actual increase amount of the output torque and maintains the generated power so as to be fixed (step S25). As a result, during the initial period, even if the output torque increases, the generated power of the rotating electric machine 20 can be suppressed. As a result, increased generated power being supplied to the high-voltage auxiliary machine 40 can be prevented. Consequently, the applied voltage that is applied to the high-voltage auxiliary machine 40 can be adjusted. In addition, the generated power is not wasted.

The ECU 100 calculates the change amount of the drive torque based on a comparison between the command increase amount of the output torque and the actual increase amount of the output torque, and determines the end of the initial period based on the change amount. That is, when determined that the change amount of the drive torque is equal to or less than the threshold (YES at step S29), the ECU 100 determines that the initial period has ended. Therefore, the change amount of the drive torque can be adjusted to be equal to or less than the threshold. In addition, when the output torque has sufficiently increased, the end of the initial period can be appropriately determined.

Even when the generated power is increased based on the power supply request, when the minimum required output torque for continuing the operation of the engine 10 is ensured (YES at step S27), the ECU 100 allows the initial period to end (ending of the initial period becomes possible). That is, at step S27, even when the initial period is ended because a determination that the operation of the engine 10 can be continued even when the requested power is applied is made, stopping of the operation of the engine 10 can be suppressed. Consequently, decrease in drivability based on stopping of the engine 10 can be prevented.

During the initial period, the ECU 100 restricts supplying generated power to the high-voltage auxiliary machine 40 based on a new power supply request. As a result, during the initial period, the load on the rotating electric machine 20, that is, increase in the power generation torque can be suppressed.

During the initial period, when determined that the applied voltage of the high-voltage auxiliary machine 40 to which generated power has been supplied from before the start of the initial period is equal to or greater than the overvoltage determination value (YES at step S28), the ECU 100 supplies generated power to a new high-voltage auxiliary machine 40 (step S32). As a result, even in cases in which the power generation efficiency cannot be reduced and the generated power increases in accompaniment with the increase in the output torque, an overvoltage being applied to the high-voltage auxiliary machine 40 can be prevented.

During the initial period, when determined that the applied voltage of the high-voltage auxiliary machine 40 is equal to or greater than the overvoltage determination value (YES at step S28), the ECU 100 maximizes the power generation efficiency and increases the generated power (step S31). Consequently, because the generated power increases as a result of adjustment of the power generation efficiency, increase in the power generation torque can be suppressed and decrease in the drive torque can be suppressed.

When determined that use of the lithium-ion storage battery 30 is restricted (NO at step S12), the ECU 100 causes the rotating electric machine 20 to generate power. Consequently, even when use of the lithium-ion storage battery 30 is restricted, electric power can be supplied to the high-voltage auxiliary machine 40.

The initial period is set even when the engine 10 is being operated to warm up the catalytic apparatus 13, and increase in the generated power may be restricted. In this case, the drive torque, of the output torque, is ordinarily set to a minimum. Therefore, when the power generation torque is increased so as to even reduce the drive torque, the drive torque may be decreased to an extent that the engine 10 stops. Therefore, during warmup, during the initial period, increase in the generated power is restricted. As a result, the operation of the engine 10 can be continued and warmup can be performed with certainty.

Other Embodiments

The present disclosure is not limited to the above-described embodiment and, for example, may be carried out in the following manner. Hereafter, sections that are identical or equivalent to each other among the embodiments are given the same reference numbers. Descriptions of sections having the same reference numbers are applicable therebetween.

According to the above-described embodiment, a plurality of high-voltage auxiliary machines 40 are provided. However, a single high-voltage auxiliary machine 40 may be provided. In addition, the rated voltage of the high-voltage auxiliary machine 40 may be arbitrarily changed. For example, the high-voltage auxiliary machine 40 may be changed to the low-voltage auxiliary machine 41.

According to the above-described embodiment, the initial period may be ended after elapse of a predetermined amount of time. As a result, a maximum amount of time from when the command to increase the output torque is issued until the generated power is increased can be controlled.

According to the above-described embodiment, during the initial period, the power generation efficiency may not be reduced based on the increase in the output torque.

According to the above-described embodiment, the power generation efficiency may not be increased and the generated power may not be increased even if the applied voltage to the high-voltage auxiliary machine 40 is equal to or greater than the overvoltage determination value.

According to the above-described embodiment, when the power generation request torque is calculated, the calculation is performed under a premise that the power generation efficiency is maximized. However, the power generation efficiency may be arbitrarily changed. For example, the power generation efficiency may be a current power generation efficiency. However, the power generation efficiency is preferably not the minimum power generation efficiency.

According to the above-described embodiment, when the initial period ends, the power generation efficiency is at maximum. However, the power generation efficiency may be arbitrarily changed.

According to the above-described embodiment, during the initial period, if the drive torque is to be fixed, the drive torque can also be calculated by the power generation torque at the start of the initial period being subtracted from the output torque at the start of the initial period. For example, the power generation torque at the start of the initial period can be calculated based on the power generation efficiency of the rotating electric machine 20 and the generated power.

According to the present embodiment, at step S11, the state determining unit 102 may determine whether the lithium-ion storage battery 30 can be used based on a state of charge (SOC) of the lithium-ion storage battery 30. For example, when the SOC of the lithium-ion storage battery 30 is equal to or less than a value that indicates an overdischarged state, the lithium-ion storage battery 30 may be determined to be unusable.

According to the above-described embodiment, even when use of the lithium-ion storage battery 30 is not restricted (YES at step S12), the processes at step S13 and steps subsequent thereto may be performed.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A control apparatus that is used in an onboard system provided to a vehicle, the onboard system including an internal combustion engine and a power generator, the power generator generating power and supplying the generated power to an electrical load provided to the vehicle, wherein an output torque of the internal combustion engine causes the vehicle to travel and causes the power generator to generate power, the control apparatus comprising:
   a torque control unit that controls the output torque of the internal combustion engine based on a power supply request by the electrical load; and
   a power generation control unit that, in response to the output torque being increased based on the power supply request, causes the power generator to generate power by the output torque, while restricting generated power during an initial period when the output torque is being increased, wherein
   the power generation control unit restricts increase in generated power accompanying increase in power generation efficiency of the power generator during the initial period, and increases the power generation efficiency of the power generator and increases the generated power after end of the initial period.

2. The control apparatus according to claim 1, wherein:
   the power generation control unit decreases power generation efficiency of the power generator based on an increase amount of the output torque, during the initial period.

3. The control apparatus according to claim 1, wherein:
   the electrical load comprises a plurality of electrical loads;
   the control apparatus further comprises a power supply control unit that controls whether the generated power is supplied to each of the plurality of electrical loads; and
   in response to the power supply request being issued from a new electrical load while the generated power is being supplied from the power generator to any of the electrical loads, the power supply control unit restricts the generated power from being supplied to the new electrical load during the initial period.

4. The control apparatus according to claim 1, further comprising:
   a determining unit that determines end of the initial period based on a comparison between a command increase amount of the output torque that is commanded to the internal combustion engine based on the power supply request and an actual increase amount of the output torque of the internal combustion engine after start of the initial period.

5. The control apparatus according to claim 4, wherein:
   the determining unit determines whether a predetermined output torque is ensured when the generated power is increased based on the power supply request, and determines the end of the initial period based on the determination result.

6. The control apparatus according to claim 1, further comprising:
   a power supply control unit that controls whether the generated power is supplied from the power generator to the electrical load based on the power supply request, wherein
   the power supply control unit restricts the generated power from being supplied to the electrical load during the initial period.

7. The control apparatus according to claim 1, wherein:
   the onboard system includes a storage battery that stores generated power from the power generator; and the power generation control unit causes the power generator to generate power when use of the storage battery is restricted.

8. The control apparatus according to claim 1, wherein:
the onboard system includes a purification apparatus that purifies exhaust gas of the internal combustion engine; and
in response to the internal combustion engine being operated to warm up the purification apparatus and the power supply request being issued, the power generation control unit causes the power generator to generate power by the output torque while restricting the generated power during the initial period.

9. A control apparatus that is used in an onboard system provided to a vehicle, the onboard system including an internal combustion engine and a power generator, the power generator generating power and supplying the generated power to an electrical load provided to the vehicle, wherein an output torque of the internal combustion engine causes the vehicle to travel and causes the power generator to generate power, the control apparatus comprising:
a torque control unit that controls the output torque of the internal combustion engine based on a power supply request by the electrical load; and
a power generation control unit that, in response to the output torque being increased based on the power supply request, causes the power generator to generate power by the output torque, while restricting generated power during an initial period when the output torque is being increased, wherein
the power generation control unit decreases power generation efficiency of the power generator based on an increase amount of the output torque, during the initial period.

10. A control apparatus that is used in an onboard system provided to a vehicle, the onboard system including an internal combustion engine and a power generator, the power generator generating power and supplying the generated power to an electrical load provided to the vehicle, wherein an output torque of the internal combustion engine causes the vehicle to travel and causes the power generator to generate power, the control apparatus comprising:
a torque control unit that controls the output torque of the internal combustion engine based on a power supply request by the electrical load; and
a power generation control unit that, in response to the output torque being increased based on the power supply request, causes the power generator to generate power by the output torque, while restricting generated power during an initial period when the output torque is being increased, wherein
the electrical load comprises a plurality of electrical load, the control apparatus further comprises a power supply control unit that controls whether the generated power is supplied to each of the plurality of electrical loads, and
in response to the power supply request being issued from a new electrical load while the generated power is being supplied from the the power generator to any of the electrical loads, the power supply control unit restricts the generated power from being supplied to the new electrical load during the initial period.

11. The control apparatus according to claim 10, wherein:
the power supply control unit supplies the generated power to the new electrical load when, during the initial period, an applied voltage of the electrical load to which the generated power has been supplied from before the start of the initial period is equal to or greater than a predetermined determination value.

12. The control apparatus according to claim 11, wherein:
the power generation control unit increases the power generation efficiency based on the new power supply request and increases the generated power when, during the initial period, the applied voltage of the electrical load to which the generated power has been supplied from before the start of the initial period is equal to or greater than the predetermined determination value.

13. An onboard system that is provided to a vehicle, the onboard system comprising:
a power generator that generates power and supplies the generated power to an electrical load provided to the vehicle;
an internal combustion engine, wherein an output torque of the internal combustion engine causes the vehicle to travel and causes the power generator to generate power; and
a control apparatus that comprises:
a torque control unit that controls the output torque of the internal combustion engine based on a power supply request by the electrical load; and
a power generation control unit that, in response to the output torque being increased based on the power supply request, causes the power generator to generate power by the output torque, while restricting generated power during an initial period when the output torque is being increased, wherein
the power generation control unit restricts increase in generated power accompanying increase in power generation efficiency of the power generator during the initial period, and increases the power generation efficiency of the power generator and increases the generated power after end of the initial period.

* * * * *